United States Patent
Hao et al.

(10) Patent No.: US 12,542,004 B2
(45) Date of Patent: Feb. 3, 2026

(54) IDENTITY RECOGNITION METHOD, COMPUTER APPARATUS, NON-TRANSITORY COMPUTER-READABLE STORAGE MEDIUM

(71) Applicant: ZHEJIANG DAHUA TECHNOLOGY CO., LTD., Hangzhou (CN)

(72) Inventors: Jingsong Hao, Hangzhou (CN); Dening Di, Hangzhou (CN); Shulei Zhu, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 208 days.

(21) Appl. No.: 18/210,628

(22) Filed: Jun. 15, 2023

(65) Prior Publication Data

US 2023/0326256 A1    Oct. 12, 2023

Related U.S. Application Data

(63) Continuation of application No. PCT/CN2021/137513, filed on Dec. 13, 2021.

(30) Foreign Application Priority Data

Dec. 15, 2020 (CN) .......................... 202011477117.0

(51) Int. Cl.
*G06V 40/70* (2022.01)
*G06V 40/16* (2022.01)
*G06V 40/50* (2022.01)

(52) U.S. Cl.
CPC ............ *G06V 40/70* (2022.01); *G06V 40/171* (2022.01); *G06V 40/172* (2022.01); *G06V 40/50* (2022.01)

(58) Field of Classification Search
CPC .... G06V 40/70; G06V 40/171; G06V 40/172; G06V 40/50; G06V 10/806; G06V 40/168; G06V 40/103; G06V 40/161; G06F 18/25
See application file for complete search history.

(56) References Cited

U.S. PATENT DOCUMENTS

| 2017/0236002 A1 | 8/2017 | Oh |
| 2017/0262472 A1 | 9/2017 | Goldenberg |
| 2018/0285542 A1 | 10/2018 | Xiao et al. |

FOREIGN PATENT DOCUMENTS

| CN | 1503194 A | 6/2004 |
| CN | 102332093 A | 1/2012 |

(Continued)

OTHER PUBLICATIONS

Assisted by Figure Information Identifying Method of Face Identity Information (machine translation of CN 1503194 (Year: 2004).*

(Continued)

*Primary Examiner* — Wassim Mahrouka (57) ABSTRACT

An identity recognition method, a computer apparatus, a non-transitory computer-readable storage medium are provided. The method includes: acquiring a to-be-identified image including a test object; extracting multi-modal features of the test object from the to-be-identified image based on a pre-established feature extraction model, the multi-modal features including at least one face feature and one human body feature; comparing the multi-modal features to modal features included by multi-modal feature sets in a (Continued)

pre-established feature registry; determining a target multi-modal set corresponding to the highest comparison score from the multi-modal feature sets, wherein each of the multi-modal feature sets incorporates at least one of the face feature and the human body feature; and determining an identity information corresponding to a target face feature included by the target multi-modality set, and determining the identity information corresponding to the target face feature as an identity information of the test object.

17 Claims, 3 Drawing Sheets

(56) References Cited

FOREIGN PATENT DOCUMENTS

| CN | 105825176 A | 8/2016 |
|---|---|---|
| CN | 105938552 A | 9/2016 |
| CN | 109920111 A | 6/2019 |
| CN | 111507232 A | 8/2020 |
| CN | 111507311 A | 8/2020 |
| CN | 111523383 A | 8/2020 |
| CN | 111563245 A | 8/2020 |
| CN | 111639616 A | 9/2020 |
| CN | 111709382 A | 9/2020 |
| CN | 111783743 A | 10/2020 |
| CN | 111931718 A | 11/2020 |
| CN | 111968152 A | 11/2020 |
| CN | 112597850 A | 4/2021 |
| KR | 20200013271 A | 2/2020 |

OTHER PUBLICATIONS

Person Recognition at a Distance: Improving Face Recognition Through Body Static Information, dated Aug. 20, 2018 (6 pages).
Template Update Methods in Adaptive Biometric Systems: A Critical Review, dated Jun. 2, 2009 (10 pages).
Score Based Biometrie Template Selection and Update, dated Dec. 13, 2008 (6 pages).
Performance Evaluationof Biometric Template Update, dated Feb. 27, 2012 (6 pages).
European Search Report, European Patent Application No. 21905669.4, mailed Apr. 17, 2024 (31 pages).
Chinese First Office Action, Chinese Patent Application No. 202011477117.0, mailed Dec. 27, 2021 (19 pages).
Notification to Grant Patent Right for Invention, Chinese Patent Application No. 202011477117.0, mailed Mar. 25, 2022 (8 pages).
India First Examination Report, India Application No. 202317045451, mailed Feb. 28, 2025 (8 pages).
Zhang, Qi Fusing Iris and Face Biometrics for Personal Identification on Mobile Devices Chinese Doctoral Dissertations & Master's Theses Full-text Database (Doctor) Information Science and Technology May 15, 2019 (May 15, 2019) ; ISSN:1674-022X No. 1138-7, pp. 55-64.
International Search Report, International Application No. PCT/CN2021/137513, mailed Mar. 9, 2022 (10 pages).
European First Examination Report, European Application No. 21905669.4, mailed Jul. 14, 2025 (30 pages).

* cited by examiner

** IDENTITY RECOGNITION METHOD, COMPUTER APPARATUS, NON-TRANSITORY COMPUTER-READABLE STORAGE MEDIUM

CROSS REFERENCE TO RELATED APPLICATIONS

The present disclosure is a continuation of International (PCT) Patent Application No. PCT/CN2021/137513 filed on Dec. 13, 2021, which claims the priority to Chinese Patent Application No. 202011477117.0, filed on Dec. 15, 2020, the entire contents of which are hereby incorporated by reference in its entirety.

TECHNICAL FIELD

The present disclosure relates to the technique field of identity recognition, and in particular to an identity recognition method, a computer apparatus, a non-transitory computer-readable non-transitory storage medium.

BACKGROUND

Face recognition is a technique used for identity recognition based on face images. In particular, feature vectors are extracted from a face image and then similarities among vectors are calculated by a certain similarity metric function. The current mainstream approach involves performing a feature extraction processing based on a convolutional neural network (CNN), and using a cosine function for similarity computation. In a general application mode, face images of multiple target persons needed to be acquired first, features extracted from these face images are used as a registration library. A feature extraction processing is performed on the face image in the video and compared the extracted features to the features in the registration library, when the similarity threshold is exceeded, the target person corresponding to the feature is identified.

However, there are problems such as face in large angles, occlusions, in complex scenes, which may lead to a relatively serious problem of identity underreporting. In addition, over time, changes such as age span between the collected registered images and the test image under test are increasingly larger, and the accuracy of the overall identity recognition becomes lower and lower.

In addition, ReID (pedestrian re-identification) of the prior art is a technique similar to face recognition, which mainly relies on human body information to perform a feature extraction and comparison processing. ReID performs more robust against short-term face occlusion, large angle, etc., but cannot be used to cope with changes such as dressing transformation. ReID is generally used to determine the trajectory of a person, while personnel identity information cannot be determined in the whole process.

It can be seen that the existing identity recognition has a technical problem with a lower accuracy.

SUMMARY OF THE DISCLOSURE

The present disclosure provides an identity recognition method, a computer apparatus, a non-transitory computer-readable storage medium, which are used to improve the accuracy of identity recognition.

According to a first aspect, an identity recognition method is provided and includes: acquiring a to-be-identified image including a test object; extracting multi-modal features of the test object from the to-be-identified image based on a pre-established feature extraction model, the multi-modal features including at least one face feature and one human body feature;

comparing the multi-modal features to modal features included by each of at least one of multi-modal feature sets in a pre-established feature registry; and determining a target multi-modal set corresponding to the highest comparison score from the at least one of the multi-modal feature sets, wherein each of the at least one of the multi-modal feature sets incorporates at least one of the face feature and the human body feature; and determining an identity information corresponding to a target face feature included by the target multi-modality set, and determining the identity information corresponding to the target face feature as an identity information of the test object.

According to a second aspect, a computer apparatus is provided, the computer apparatus includes a processor. The processor is configured to implement the identity recognition method described in the above when executing a computer program stored in a memory.

According to a third aspect, a non-transitory computer-readable storage medium is provided and is configured to store a computer program. The computer program is configured to implement the identity recognition method described in the above when executed by a processor.

DETAILED DESCRIPTION

The "first", "second" and the like, in the specification, claims and drawings in the above of the present disclosure are used to distinguish different objects and not used to describe a particular order. Furthermore, the terms "including", "including" and any variations thereof, are intended to cover a non-exclusive inclusion. For example, a process, a method, a system, a product or an apparatus including a series of operations or units is not limited to the operations or units as listed, but may optionally include other operations or units not listed or inherent to such process, method, product or apparatus.

Reference to "an embodiment" herein means that a particular feature, structure, or characteristic described in connection with the embodiment can be included in at least one embodiment of the present disclosure. The phrase appearing at various positions in the specification is not necessarily all referring to the same embodiment, nor are a separate or alternative embodiment mutually exclusive with other embodiments. It is explicitly and implicitly understood by one of ordinary skill in the art that the embodiments described herein may be combined with other embodiments.

In order to better understand the aforementioned technical solutions, a detailed illustration for the present disclosure will be given by reference to the accompanying drawings and specific embodiments. It is to be understood that the embodiments, as well as specific features of the embodiments, are detailed illustrations not limitations for the technical solutions of the present disclosure. In the case of no conflict, the embodiments and specific features of the embodiments may be combined with each other.

In complex scenarios, there tend to be problems such as face in large angles, occlusions, resulting in a missed recognition and a false recognition of the identity recognition, thereby leading to a lower accuracy of the identity recognition. Further, in the prior art, pedestrian re-recognition is also adopted to perform feature extraction and comparison based on human information, so as to determine the trajectory information of the target object. However, not only the target identity cannot be determined based on the human information, but the target object cannot be accurately identified once the target object transforms clothes.

In view of the problems above, embodiments of the present disclosure provide an identity recognition method and apparatus to improve the accuracy of the identity recognition.

Figure 1:
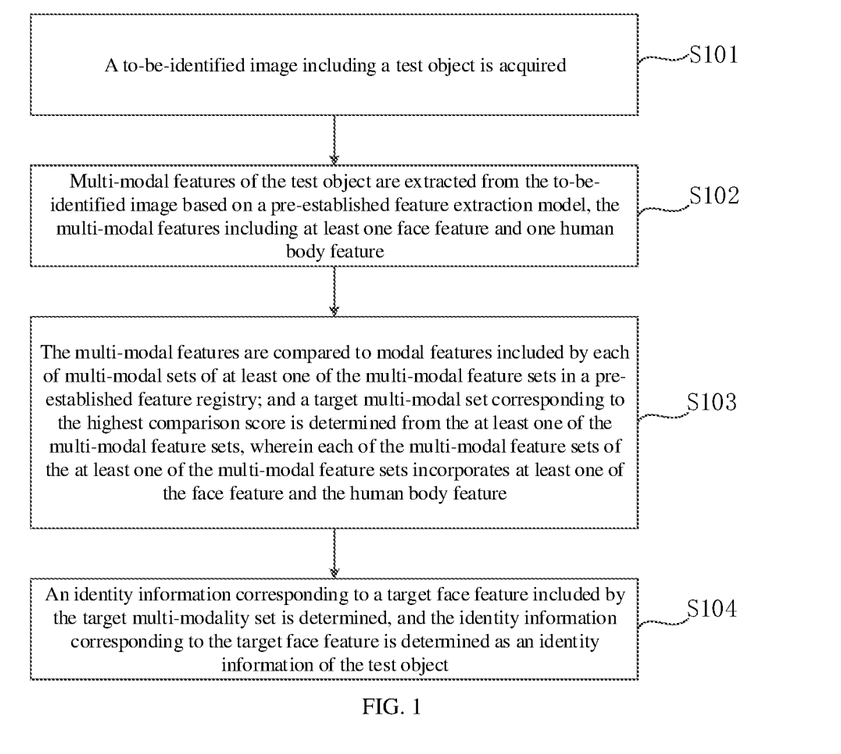
FIG. 1 is a flow chart of an identity recognition method according to an embodiment of the present disclosure.

As shown in FIG. 1, embodiments of the present disclosure provide an identity recognition method. The method includes following operations.

S101: A to-be-identified image including a test object is acquired.

In a specific implementation process, the to-be-identified image may be an image acquired by an image acquisition unit, or may be an image acquired via other channels, such as an image downloaded from a cloud, which is not limited herein.

S102: Multi-modal features of the test object are extracted from the to-be-identified image based on a pre-established feature extraction model, the multi-modal features including at least one face feature and one human body feature.

In a specific implementation process, modal features included in the multi-modal features are different, and accordingly, the pre-established feature extraction model adopted may be different. When the multi-modal features include a face feature and a human body feature, the face feature of the test object may be extracted from the to-be-identified image by a pre-established face recognition feature extraction model, and the human feature of the test object may be extracted from the to-be-identified image by a pre-established human body recognition feature model. For example, the acquired face feature is $pf_{face}$, the acquired human body feature is $pf_{body}$. Accordingly, a set including the face feature $pf_{face}$ and the human body feature $pf_{body}$ is constructed, and the set are multi-modal features corresponding to the test object. In addition, the multi-modal features may also include a head-shoulder feature, a gait feature, and the like, besides the face feature and the human body feature. The various modal features included in the multi-modal features may be set according to actual application needs, not limited herein.

S103: The multi-modal features are compared to modal features included by each of at least one of multi-modal feature sets in a pre-established feature registry; and a target multi-modal set corresponding to the highest comparison score is determined from the at least one of the multi-modal feature sets, wherein each of the at least one of the multi-modal feature sets incorporates at least one of the face feature and the human body feature.

In an embodiment, the pre-established feature registry includes at least one of multi-modal feature sets. The at least one of the multi-modal feature sets may be one or multiple, not limited herein. After the multi-modal features of the test object are extracted, the multi-modal features may be compared to the modal features included by each of the multi-modal feature sets in the feature registry, to determine the target multi-modal set corresponding to the highest comparison score from the at least one of the multi-modal feature sets in the feature registry. For example, the multi-modal features include the face feature and the human body feature, and each of the multi-modal feature sets in the feature registry includes the face feature and the human body feature. The multi-modal features including the face feature and the human body feature may be compared to the modal features in each of the multi-modal feature sets fusing the face feature and the human body feature in the feature registry. For another example, the multi-modal features include the face feature, the human body feature, and the head-shoulder feature, and each of the multi-modal feature sets in the feature registry includes the face feature, the human body feature, and the head-shoulder feature. The multi-modal features including the face feature, the human body feature, and the head-shoulder feature may be compared to the modal features in each of the multi-modal feature sets fusing the face feature, the human body feature, and the head-shoulder feature in the feature registry. Other comparison situations for the multi-modal features are not described in detail one by one herein. After a comparison processing is performed on each of multi-modal feature sets in the at least one of multi-modal feature sets in the feature registry, the target multi-modal set corresponding to the highest comparison score may be determined from the at least one of the multi-modal feature sets.

S104: An identity information corresponding to a target face feature included by the target multi-modality set is determined, and the identity information corresponding to the target face feature is determined as an identity information of the test object.

In a specific implementation process, after the target multi-modal set corresponding to the highest comparison score is determined, the target face feature included by the target multi-modal set may be determined, thereby the identity information corresponding to the target face feature is determined. The identity information corresponding to the target face feature is determined as an identity information of the test object, such that the identity recognition for the test object is realized. Since the entire identification process is performed based on the fused features, the accuracy of the identity recognition may be improved.

Figure 2:
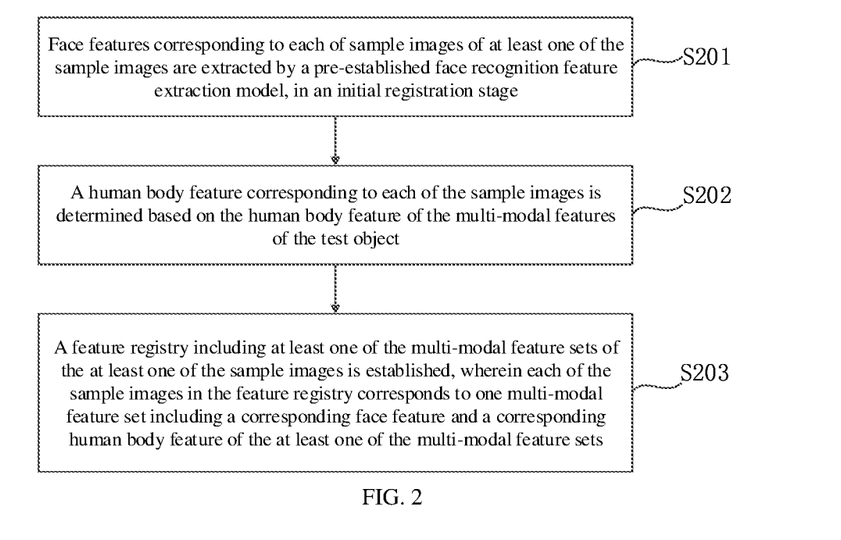
FIG. 2 is a flow chart before an operation S103 in an identity recognition method according to an embodiment of the present disclosure.

In an embodiment, as shown in FIG. 2, before the operation S103: The multi-modal features are compared to modal features included by each of at least one of the multi-modal feature sets in a pre-established feature registry; and the target multi-modal set corresponding to the highest comparison score is determined from the at least one of the multi-modal feature sets, the method further includes:

S201: Face features corresponding to each of at least one of the sample images are extracted by a pre-established face recognition feature extraction model, in an initial registration stage;

S202: A human body feature corresponding to each of the sample images is determined based on the human body feature of the multi-modal features of the test object;

S203: A feature registry including at least one of the multi-modal feature sets of the at least one of the sample images is established, wherein each of the sample images in the feature registry corresponds to one multi-modal feature set including a corresponding face feature and a corresponding human body feature of the at least one of the multi-modal feature sets.

In a specific implementation process, the specific implementation process of operations S201 to S203 is as follows:

Before the multi-modal features of the test object are compared, a feature registry is established in advance. In particular, in an initial registration stage, face features corresponding to each of at least one of the sample images are extracted by a pre-established face recognition feature extraction model; wherein the at least one sample image may be multiple, each of sample images corresponding to one sample object. That is, a sample image of each of the sample objects is pre-entered, and the face feature corresponding to each of pre-entered sample images is extracted based on a pre-established face recognition feature extraction model, thereby a face base G (0) for each of the sample objects is established. Each object includes only one face feature $\{gf_{face}(0)\}$, such that a pre enter for the face feature is realized. Only the face feature is required to be entered in advance in the initial registration stage, thereby the complexity of identity recognition may be simplified. In addition, only a single-modal face feature is needed to be entered in advance throughout the entire identity recognition process, which is more practical for large-scale scenarios. Based on the human body feature of the multi-modal features of the test object, a human body feature corresponding to each of the sample images is determined. That is, when an identity recognition is performed on the test object, the human body feature of the multi-modal features of the test object can be taken as human body feature corresponding to each of the sample images. A feature registry including at least one of the multi-modal feature sets of the at least one of the sample images is established. Each of the sample images in the feature registry corresponds to one multi-modal feature set of the at least one of the multi-modal feature sets including a corresponding face feature and a corresponding human body feature. Subsequently, the multi-modal features of the test object may be compared to modal features fusing the face feature and the human body feature, in each of the multi-modal feature sets in the feature registry, and accordingly the accuracy of identity recognition of the test object is improved. When the multi-modal features include other modal features besides the face feature and the human body feature, the other modal features correspond to the test object may be determined as modality features corresponding to each of the sample images, which is not described in detail herein.

Figure 3:
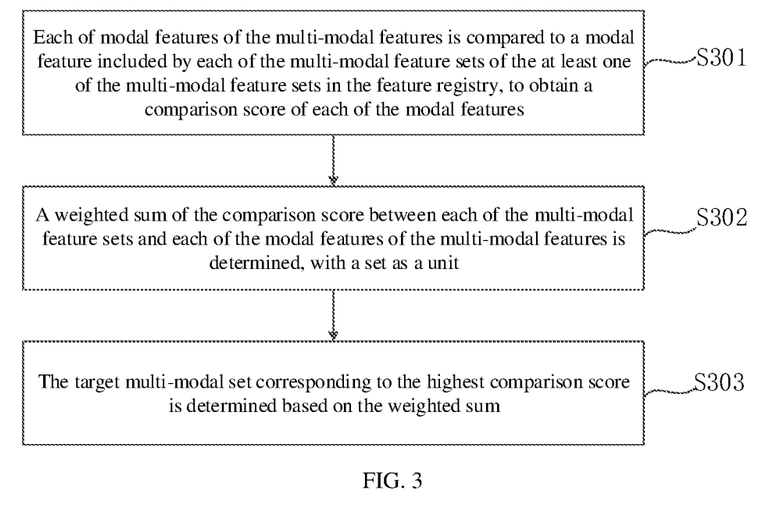
FIG. 3 is a flow chart of an operation S103 in an identity recognition method according to an embodiment of the present disclosure.

In an embodiment, as shown in FIG. 3, an operation S103: The multi-modal features are compared to modal features included by each of at least one of the multi-modal feature sets in a pre-established feature registry; and the target multi-modal set corresponding to the highest comparison score is determined from the at least one of the multi-modal feature sets, includes:

S301: Each of modal features of the multi-modal features is compared to a modal feature included by each of at least one of the multi-modal feature sets in the feature registry, to obtain a comparison score of each of the modal features;

S302: A weighted sum of the comparison score between each of the multi-modal feature sets and each of the modal features of the multi-modal features is determined, with a set as a unit;

S303: the target multi-modal set corresponding to the highest comparison score is determined based on the weighted sum.

In a specific implementation progress, the specific implementation progress of operations S301 to S302 is as follows:

Each of modal features of the multi-modal features is compared to a modal feature included by each of at least one of the multi-modal feature sets in the feature registry, to obtain a comparison score of each of the modal features, so as to realize the comparison of multi-modal features. For example, the multi-modal features include the face feature and the human body feature, the face feature of the multi-modal features is compared to the face feature in each of the multi-modal feature sets, obtaining a comparison score of the face feature. The human body feature of the multi-modal features is compared to a human body feature in each of the multi-modal feature sets, obtaining a comparison score of the human body feature. A weighted sum of the comparison score between each of the multi-modal feature sets and each of the modal features of the multi-modal features is determined, with a set as a unit. The weighted sum is taken as a final score for the corresponding multi-modal feature set. Compared with a comparison of the face feature or the human body feature in a single modal, complementarity between features may be taken full advantage of, and defects of comparing respectively are avoided; the comparison accuracy may be improved. Based on the weighted sum, the target multi-modal set corresponding to the highest comparison score is determined from the at least one multi-modal set. A face identity recognition is performed based on the target multi-modal set, so as to improve the recognition accuracy.

In an embodiment, the weighted sum of the comparison score between each of the multi-modal feature sets and each of the modal features of the multi-modal features is determined based on the following formula:

$$S=a*d(pf_{face},gf_{face}(t))+(1-a)*d(pf_{body},gf_{body}(t))$$

S represents the weighted sum of the comparison score between each of the multi-modal feature sets and each of the modal features of the multi-modal features, $Pf_{face}$ represents the face feature of the multi-modal features, $pf_{body}$ represents the human body feature of the multi-modal feature, $gf_{face}(t)$ represents the face feature of each of the multi-modal feature sets, $gf_{body}(t)$ represents the human body feature of each of the multi-modal feature sets, d represents a similarity metric function, and a represents a preset weight, t=0 represents the initial registration stage, t>0 represents an update stage.

In a specific implementation, the similarity metric function may be a cosine similarity function, or a Euclidean distance function, or the like, not limited herein. When the multi-modal feature includes the face feature and the human body feature, the preset weight is used to determine a weighted proportion of the face feature and the human body feature. Since in the initial registration stage, only the face feature is entered into the feature registry, the preset weight may be 1 in the initial registration stage. In other stages except for the initial registration stage, the preset weight may be 0.6, may also be set to 0.5 or 0.3, and the specific numerical size of the preset weight at other stages can be set according to the actual application needs, not limited herein. Once the weighted sum of the comparison scores between the multi-modal features fusing the face feature and the human body feature, of the test object, and modal features in each of the multi-modal feature sets in the feature registry, is determined by adopting the above formula, the target modal feature set corresponding to the highest comparison score may be determined.

Figure 4:
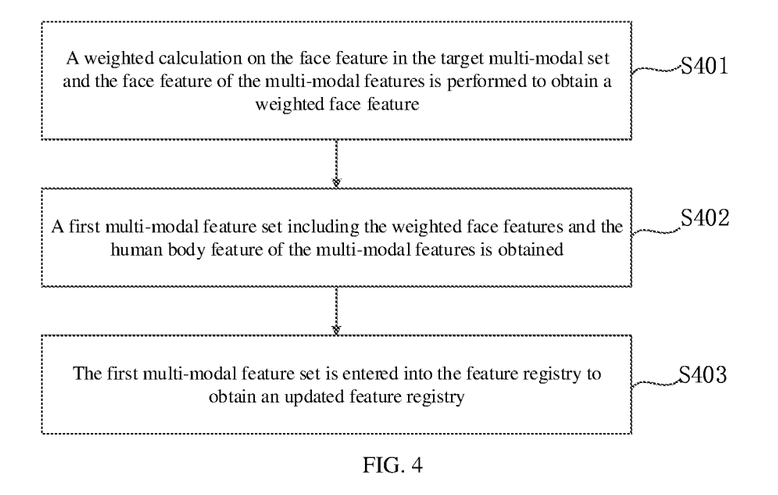
FIG. 4 is a flow chart of a first implement manner for a feature registry update according to an embodiment of the present disclosure.

In the embodiment, as shown in connection with FIG. 4, and FIG. 5, when the highest comparison score is greater than a predetermined threshold, an update processing may be performed on the pre-established feature registry in two implementation ways as follows, but not limited to the two implementation ways as follows. As shown in FIG. 4, after the operation S103: The multi-modal features are compared to modal features included by each of at least one of the multi-modal feature sets in a pre-established feature registry; and the target multi-modal set corresponding to the highest comparison score is determined from the at least one of the multi-modal feature sets, the first implementation way includes:

S401: A weighted calculation on the face feature in the target multi-modal set and the face feature of the multi-modal features is performed to obtain a weighted face feature;

S402: A first multi-modal feature set including the weighted face features and the human body feature of the multi-modal features is obtained;

S403: The first multi-modal feature set is entered into the feature registry to obtain an updated feature registry.

In a specific implementation progress, the specific implementation progress of operations of S401 to S403 is as follows:

After the target multi-modal set corresponding to the highest comparison score from the at least one of the multi-modal feature sets is determined, a weighted calculation on the face feature in the target multi-modal set and the face feature of the multi-modal features is performed to obtain a weighted face feature. The weighted face feature fuses the face feature of the current test object and the historical face feature in the target multi-modal set. A first multi-modal feature set including the weighted face feature and the human body feature of the multi-modal features is obtained. The first multi-modal feature set is entered into the feature registry to obtain an updated feature registry. In this way, during the identity recognition for each of the test objects, the human body feature can be entered in real time, and the human body feature is updated in real time, and the face feature is updated in real time, such that a real-time update to the feature registry is realized, and the recognition accuracy is further improved. Furthermore, the resource consumption will not be increased by a weighted sum manner to obtain a fixed length feature. In addition, each of the modal features in the feature registry become more robust over time, and accordingly, the recognition accuracy become higher and higher.

Figure 5:
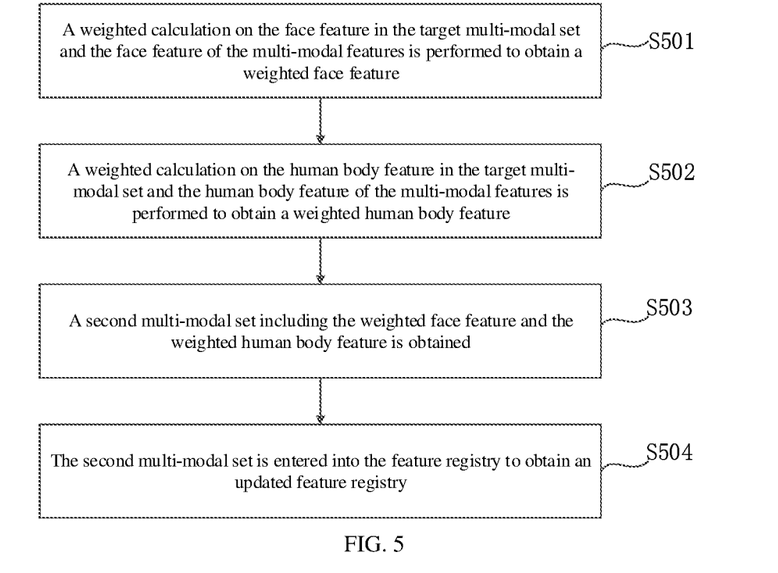
FIG. 5 is a flow chart of a second implement manner for a feature registry update according to an embodiment of the present disclosure.

In an embodiment, as shown in FIG. 5, after the operation S103: The multi-modal features are compared to modal features included by each of at least one of the multi-modal feature sets in a pre-established feature registry; and the target multi-modal set corresponding to the highest comparison score is determined from the at least one of the multi-modal feature sets, the second implementation way includes:

S501: A weighted calculation on the face feature in the target multi-modal set and the face feature of the multi-modal features is performed to obtain a weighted face feature;

S502: A weighted calculation on the human body feature in the target multi-modal set and the human body feature of the multi-modal features is performed to obtain a weighted human body feature;

S503: A second multi-modal set including the weighted face feature and the weighted human body feature is obtained;

S504: The second multi-modal set is entered into the feature registry to obtain an updated feature registry.

In a specific implementation process, the specific implementation process of operations S501 to S504 is as follows:

After the target multi-modal set corresponding to the highest comparison score from the at least one of the multi-modal feature sets is determined, a weighted calculation on the face feature in the target multi-modal set and the face feature of the multi-modal features is performed to obtain a weighted face feature. The weighted face feature fuses the face feature of the current test object and the historical face feature in the target multi-modal set. Accordingly, a weighted calculation on the human body feature in the target multi-modal set and the human body feature of the multi-modal features is performed to obtain a weighted human body feature. The weighted human body feature fuses a human body of the current test object and a historical human body feature in the target multi-modal set. A second multi-modal feature set including the weighted face feature and the weighted human body feature of the multi-modal features is obtained. The second multi-modal feature set is entered into the feature registry to obtain an updated feature registry. In this way, during the identity recognition for each of the test objects, the face feature can be may be updated in real time, and the human body feature is updated in real time, such that a real-time update to the feature registry is realized, and the recognition accuracy is further improved.

In an embodiment, the weighted face feature is obtained based on the following formula:

$$gf_{face}(t+1)=(1-S)*gf_{face}(t)+S*pf_{face}$$

wherein S represents the highest comparison score, $gf_{face}(t)$ represents the face feature in the target multi-modal set, $pf_{face}$ represents the face feature of the multi-modal features, $gf_{face}(t+1)$ represents the weighted face feature.

In a specific implementation process, the face feature corresponding to $gf_{face}(t)$ is substantially the historical face feature, while the face feature corresponding to $pf_{face}$ is substantially the face feature of the current test object. The weighted face feature may be an updated face feature, so as to realize an update to the face base in the feature registry. Due to the updated face base including historical information of the face feature and real-time information of the face feature, thereby the accuracy of the identity recognition may be improved.

In an embodiment, the weighted human body feature is obtained based on the following formula:

$$gf_{body}(t+1)=(1-S)gf_{body}(t)+S*pf_{body}$$

wherein S represents the highest comparison score, $gf_{body}(t)$ represents the human body feature in the target multi-modal set, $pf_{body}$ represents the human body feature of the multi-modal features, $gf_{body}(t+1)$ represents the weighted human body feature.

In a specific implementation process, the human body feature corresponding to $gf_{body}(t)$ is substantially the historical human body feature, while the human body feature corresponding to pf$_{body}$ is substantially the human body feature of the current test object. The weighted human body feature may be an updated human body feature, so as to realize an update to the human body feature in multi-modal feature sets in the feature registry. Due to the updated feature registry including historical information of the human body feature and real-time information of the human body feature, the problems of low face recognition accuracy over a long time span is effectively avoided, and thereby the accuracy of the identity recognition may be improved.

In a specific implementation process, after a comparison is performed on the test objects, for the update of the feature registry in the initial registration stage, the updated human body feature gf$_{face}$(t+1) of the feature registry can be pf$_{body}$. Subsequently during the recognition for other objects, a comparison can be performed based on the updated feature registry. Furthermore, the resource consumption will not be increased by a weighted sum manner to obtain a fixed length feature. In addition, each of the modal features in the feature registry become more robust over time, and accordingly, the recognition accuracy become higher and higher.

Figure 6:
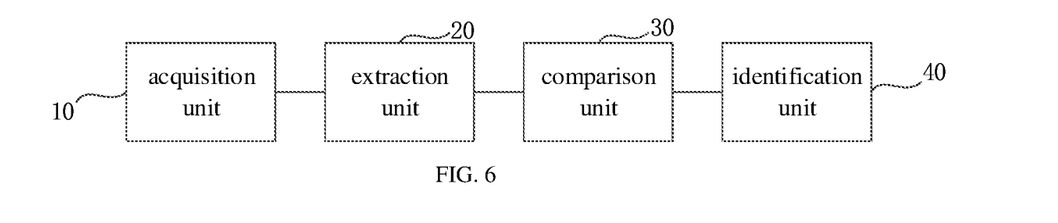
FIG. 6 is a structural schematic view of an identity recognition apparatus according to an embodiment of the present disclosure.

Based on the same inventive concept, as shown in FIG. 6, embodiments of the present disclosure provide an identity recognition apparatus, including:

an acquisition unit 10, configured to acquire a to-be-identified image including a test object;

an extraction unit 20, configured to extract multi-modal features of the test object from the to-be-identified image based on a pre-established feature extraction model, the multi-modal features including at least one face feature and one human body feature;

an comparison unit 30, configured to compare the multi-modal features to modal features included by each of at least one of multi-modal feature sets in a pre-established feature registry; and determine a target multi-modal set corresponding to the highest comparison score from the at least one of the multi-modal feature sets, wherein each of the at least one of the multi-modal feature sets incorporates at least one of the face feature and the human body feature; and an identification unit 40, configured to determine an identity information corresponding to a target face feature included by the target multi-modality set, and determine the identity information corresponding to the target face feature as an identity information of the test object.

In a specific implementation process, specific implementations of the identity recognition apparatus, please refer to the description of the identity recognition method for details, which will not be repeated herein.

In an embodiment, the apparatus further includes an establishment unit configured to:

extract face features corresponding to each of at least one of the sample images by a pre-established face recognition feature extraction model, in an initial registration stage;

determine a human body feature corresponding to each of the sample images based on the multi-modal features of the test object; and establish a feature registry including the at least one of the sample images, wherein each of the sample images in the feature registry corresponds to one multi-modal feature set including a corresponding face feature and a corresponding human body feature.

In an embodiment, the comparison unit 30 is configured to:

compare each of modal features of the multi-modal features to a modal feature included by each of the multi-modal feature sets of the at least one of multi-modal feature sets in the feature registry, to obtain a comparison score of each of the modal features;

determine a weighted sum of the comparison score between each of the multi-modal feature sets and each of the modal features of the multi-modal features, with a set as a unit; and determine the target multi-modal set corresponding to the highest comparison score based on the weighted sum.

In an embodiment, the comparison unit 30 is configured to:

a weighted sum of a comparison score between each of the multi-modal feature sets and each of modal features is determined based on the following formula:

$$S = a*d(pf_{face}, gf_{face}(t)) + (1-a)*d(pf_{body}, gf_{body}(t))$$

S represents the weighted sum of the comparison score between each of the multi-modal feature sets and each of the modal features of the multi-modal features, pf$_{face}$ represents the face feature of the multi-modal features, pf$_{body}$ represents the human body feature of the multi-modal feature, gf$_{face}$(t) represents the face feature of each of the multi-modal feature sets, gf$_{body}$(t) represents the human body feature of each of the multi-modal feature sets, d represents a similarity metric function, and a represents a preset weight.

In an embodiment, when the highest comparison score is greater than a preset threshold, the apparatus further includes a first update unit, the first update unit is configured to:

perform a weighted calculation on the face feature in the target multi-modal set and the face feature of the multi-modal features to obtain a weighted face feature;

obtain a first multi-modal feature set including the weighted face features and the human body feature of the multi-modal features; and enter the first multi-modal feature set into the feature registry to obtain an updated feature registry.

In an embodiment, when the highest comparison score is greater than a preset threshold, the apparatus further includes a second update unit, the second update unit is configured to:

perform a weighted calculation on the face feature in the target multi-modal set and the face feature of the multi-modal features to obtain a weighted face feature;

perform a weighted calculation on the human body feature in the target multi-modal set and the human body feature of the multi-modal features to obtain a weighted human body feature;

obtain a second multi-modal set including the weighted face feature and the weighted human body feature; and enter the second multi-modal set into the feature registry to obtain an updated feature registry.

In an embodiment, the first update unit or the second update unit is configured to obtain the weighted face feature based on the following formula:

$$gf_{face}(t+1) = (1-S)*gf_{face}(t) + S*pf_{face}$$

wherein S represents the highest comparison score, gf$_{face}$(t) represents the face feature in the target multi-modal set, pf$_{face}$ represents the face feature of the multi-modal features, gf$_{face}$(t+1) represents the weighted face feature.

In an embodiment, the second update unit is configured to obtain the weighted human body feature based on the following formula:

$$gf_{body}(t+1) = (1-S)gf_{body}(t) \pm S*pf_{body},$$

wherein S represents the highest comparison score, $gf_{body}$(t) represents the human body feature in the target multi-modal set, $pf_{body}$ represents the human body feature of the multi-modal features, $gf_{body}$(t+1) represents the weighted human body feature.

Based on the same invention concept, embodiments of the present disclosure provide a computer apparatus, the computer apparatus includes a processor. The processor is configured to implement the identity recognition method described in the above when executing a computer program stored in a memory.

Based on the same invention concept, embodiments of the present disclosure provide a non-transitory computer-readable storage medium configured to store a computer program. The computer program is configured to implement the identity recognition method described in the above when executed by a processor.

As will be appreciated by one skilled in the art, embodiments of the present disclosure may be provided as a method, system, or computer program product. Accordingly, the present disclosure may take the form of an entirely hardware embodiment, an entirely software embodiment, or an embodiment combining software and hardware aspects. Furthermore, the present disclosure may take the form of a computer program product embodied on one or more computer-usable non-transitory storage media with computer-usable program codes embodied therein, (including, but not limited to, magnetic disk storage, CD-ROM, optical storage, and the like).

The present disclosure is described with reference to flow charts and/or block diagrams of methods, apparatus (systems), and computer program products of the present disclosure. It should be understood that each of flows and/or blocks, and combinations of flows and/or blocks, of the flow charts and/or block diagrams, can be implemented by computer program instructions. These computer program instructions may be provided to a processor of a general purpose computer, special purpose computer, embedded processor, or other programmable data processing apparatus to produce a machine, such that the instructions executed by a processor of a computer or other programmable data processing apparatuses, generate an apparatus which is configured to implement the functions specified in one or multiple flows of the flow charts and/or one or multiple blocks in the block diagrams.

These computer program instructions may also be stored in a computer-readable memory that can direct a computer or other programmable data processing apparatuses to function in a particular manner, such that the instructions stored in the computer-readable memory produce manufacturing products including an instruction apparatus. The instruction apparatus can implement the function specified in one or multiple flows of the flow charts and/or one or multiple blocks in the block diagrams.

These computer program instructions may also be loaded onto a computer or other programmable data processing apparatus, to make a series of operations performed on the computer or other programmable apparatus, to generate a process implemented by a computer, such that the instructions executed on the computer or other programmable apparatus are configured to provide operations for implementing the functions specified in one or multiple flows of the flow charts and/or one or multiple blocks in the block diagrams.

Apparently, those skilled in the art can make various modifications and variations to the present disclosure without departing from the spirit and scope of the present disclosure. In this way, when these modifications and variations for the present disclosure are within the scope of claims and their equivalent techniques of the present disclosure, it is intended that the present disclosure also includes these modifications and variations.

What is claimed is:

1. An identity recognition method, comprising:
    acquiring a to-be-identified image comprising a test object;
    extracting multi-modal features of the test object from the to-be-identified image based on a pre-established feature extraction model, the multi-modal features comprising at least one face feature and one human body feature;
    comparing the multi-modal features to modal features comprised by each of at least one of multi-modal feature sets in a pre-established feature registry; and determining a target multi-modal set corresponding to the highest comparison score from the at least one of the multi-modal feature sets, wherein each of the at least one of the multi-modal feature sets incorporates at least one of the face feature and the human body feature; and
    determining an identity information corresponding to a target face feature comprised by the target multi-modality set, and determining the identity information corresponding to the target face feature as an identity information of the test object;
    before the comparing the multi-modal features to the modal features comprised by each of at least one of the multi-modal feature sets in the pre-established feature registry, the method further comprising:
    extracting face features corresponding to each of at least one of sample images by a pre-established face recognition feature extraction model, in an initial registration stage;
    determining a human body feature corresponding to each of the sample images based on the human body feature of the multi-modal features of the test object; and
    establishing a feature registry comprising at least one of the multi-modal feature sets of the at least one of the sample images, wherein each of the sample images in the feature registry corresponds to one multi-modal feature set comprising a corresponding face feature and a corresponding human body feature of the at least one of the multi-modal feature sets.

2. The method according to claim 1, wherein the comparing the multi-modal features to modal features comprised by each of at least one of the multi-modal feature sets in the pre-established feature registry; and determining the target multi-modal set corresponding to the highest comparison score from the at least one of the multi-modal feature sets, comprises:
    comparing each of modal features of the multi-modal features to the modal feature comprised by each of the at least one of the multi-modal feature sets in the feature registry, to obtain a comparison score of each of the modal features;
    determining a weighted sum of the comparison score between each of the multi-modal feature sets and each of the modal features of the multi-modal features, with a set as a unit; and
    determining the target multi-modal set corresponding to the highest comparison score based on the weighted sum.

3. The method according to claim 2, wherein the weighted sum of the comparison score between each of the multi-modal feature sets and each of the modal features of the multi-modal features is determined based on the following formula:

$$S=a*d(pf_{face}, gf_{face}(t))+(1-a)*d(pf_{body}, gf_{body}(t))$$

wherein S represents the weighted sum of the comparison score between each of the multi-modal feature sets and each of the modal features of the multi-modal features, $pf_{face}$ represents the face feature of the multi-modal features, $pf_{body}$ represents the human body feature of the multi-modal feature, $gf_{face}(t)$ represents the face feature of each of the multi-modal feature sets, $gf_{body}(t)$ represents the human body feature of each of the multi-modal feature sets, d represents a similarity metric function, and a represents a preset weight.

4. The method according to claim 1, wherein when the highest comparison score is greater than a preset threshold, after the determining the target multi-modal set corresponding to the highest comparison score from the at least one of the multi-modal feature sets, the method further comprises:
    performing a weighted calculation on the face feature in the target multi-modal set and the face feature of the multi-modal features to obtain a weighted face feature;
    obtaining a first multi-modal feature set comprising the weighted face features and the human body feature of the multi-modal features; and
    entering the first multi-modal feature set into the feature registry to obtain an updated feature registry.

5. The method according to claim 1, wherein when the highest comparison score is greater than a preset threshold, after the determining the target multi-modal set corresponding to the highest comparison score from the at least one of the multi-modal feature sets, the method further comprises:
    performing a weighted calculation on the face feature in the target multi-modal set and the face feature of the multi-modal features to obtain a weighted face feature;
    performing a weighted calculation on the human body feature in the target multi-modal set and the human body feature of the multi-modal features to obtain a weighted human body feature;
    obtaining a second multi-modal set comprising the weighted face feature and the weighted human body feature; and
    entering the second multi-modal set into the feature registry to obtain an updated feature registry.

6. The method according to claim 4, wherein the weighted face feature is obtained based on the following formula:

$$gf_{face}(t+1)=(1-S)*gf_{face}(t)+S*pf_{face}$$

wherein S represents the highest comparison score, $gf_{face}(t)$ represents the face feature in the target multi-modal set, $pf_{face}$ represents the face feature of the multi-modal features, $gf_{face}(t+1)$ represents the weighted face feature.

7. The method according to claim 5, wherein the weighted human body feature is obtained based on the following formula:

$$gf_{body}(t+1)=(1-S)gf_{body}(t)+S*pf_{body}$$

wherein S represents the highest comparison score, $gf_{body}(t)$ represents the human body feature in the target multi-modal set, $pf_{body}$ represents the human body feature of the multi-modal features, $gf_{body}(t+1)$ represents the weighted human body feature.

8. A computer apparatus, comprising a processor, wherein when executing a computer program stored in a memory, the processor is configured to implement:
    acquiring a to-be-identified image comprising a test object;
    extracting multi-modal features of the test object from the to-be-identified image based on a pre-established feature extraction model, the multi-modal features comprising at least one face feature and one human body feature;
    comparing the multi-modal features to modal features comprised by each of at least one of multi-modal feature sets in a pre-established feature registry; and determining a target multi-modal set corresponding to the highest comparison score from the at least one of the multi-modal feature sets, wherein each of the at least one of the multi-modal feature sets incorporates at least one of the face feature and the human body feature; and
    determining an identity information corresponding to a target face feature comprised by the target multi-modality set, and determining the identity information corresponding to the target face feature as an identity information of the test object;
    before the comparing the multi-modal features to the modal features comprised by each of at least one of the multi-modal feature sets in the pre-established feature registry, the method further comprising:
    extracting face features corresponding to each of at least one of sample images by a pre-established face recognition feature extraction model, in an initial registration stage;
    determining a human body feature corresponding to each of the sample images based on the human body feature of the multi-modal features of the test object; and
    establishing a feature registry comprising at least one of the multi-modal feature sets of the at least one of the sample images, wherein each of the sample images in the feature registry corresponds to one multi-modal feature set comprising a corresponding face feature and a corresponding human body feature of the at least one of the multi-modal feature sets.

9. The computer apparatus according to claim 8, wherein the processor is further configured to implement:
    comparing each of modal features of the multi-modal features to the modal feature comprised by each of the at least one of the multi-modal feature sets in the feature registry, to obtain a comparison score of each of the modal features;
    determining a weighted sum of the comparison score between each of the multi-modal feature sets and each of the modal features of the multi-modal features, with a set as a unit; and
    determining the target multi-modal set corresponding to the highest comparison score based on the weighted sum.

10. The computer apparatus according to claim 9, wherein the weighted sum of the comparison score between each of the multi-modal feature sets and each of the modal features of the multi-modal features is determined based on the following formula:

$$S=a*d(pf_{face},gf_{face}(t))+(1-a)*d(pf_{body},gf_{body}(t))$$

wherein S represents the weighted sum of the comparison score between each of the multi-modal feature sets and each of the modal features of the multi-modal features, $pf_{face}$ represents the face feature of the multi-modal features, $pf_{body}$ represents the human body feature of the multi-modal feature, $gf_{face}(t)$ represents the face feature of each of the multi-modal feature sets, $gf_{body}(t)$ represents the human body feature of each of the multi-modal feature sets, d represents a similarity metric function, and a represents a preset weight.

11. The computer apparatus according to claim 8, wherein when the highest comparison score is greater than a preset threshold, after the determining the target multi-modal set corresponding to the highest comparison score from the at least one of the multi-modal feature sets, the processor is further configured to implement:
performing a weighted calculation on the face feature in the target multi-modal set and the face feature of the multi-modal features to obtain a weighted face feature;
obtaining a first multi-modal feature set comprising the weighted face features and the human body feature of the multi-modal features; and
entering the first multi-modal feature set into the feature registry to obtain an updated feature registry.

12. The computer apparatus according to claim 8, wherein when the highest comparison score is greater than a preset threshold, after the determining the target multi-modal set corresponding to the highest comparison score from the at least one of the multi-modal feature sets, the processor is further configured to implement:
performing a weighted calculation on the face feature in the target multi-modal set and the face feature of the multi-modal features to obtain a weighted face feature;
performing a weighted calculation on the human body feature in the target multi-modal set and the human body feature of the multi-modal features to obtain a weighted human body feature;
obtaining a second multi-modal set comprising the weighted face feature and the weighted human body feature; and
entering the second multi-modal set into the feature registry to obtain an updated feature registry.

13. The computer apparatus according to claim 11, wherein the weighted face feature is obtained based on the following formula:

$$gf_{face}(t+1)=(1-S)*gf_{face}(t)+S*Pf_{face}$$

wherein S represents the highest comparison score, $gf_{face}(t)$ represents the face feature in the target multi-modal set, pf face represents the face feature of the multi-modal features, $gf_{face}(t+1)$ represents the weighted face feature.

14. The computer apparatus according to claim 12, wherein the weighted human body feature is obtained based on the following formula:

$$gf_{body}(t+1)=(1-S)gf_{body}(t)+S*pf_{body}$$

wherein S represents the highest comparison score, $gf_{body}(t)$ represents the human body feature in the target multi-modal set, $pf_{body}$ represents the human body feature of the multi-modal features, $gf_{body}(t+1)$ represents the weighted human body feature.

15. A non-transitory computer-readable storage medium, configured to store a computer program, wherein when executed by a processor, the computer program is configured to implement:
acquiring a to-be-identified image comprising a test object;
extracting multi-modal features of the test object from the to-be-identified image based on a pre-established feature extraction model, the multi-modal features comprising at least one face feature and one human body feature;
comparing the multi-modal features to modal features comprised by each of at least one of multi-modal feature sets in a pre-established feature registry; and
determining a target multi-modal set corresponding to the highest comparison score from the at least one of the multi-modal feature sets, wherein each of the at least one of the multi-modal feature sets incorporates at least one of the face feature and the human body feature; and
determining an identity information corresponding to a target face feature comprised by the target multi-modality set, and determining the identity information corresponding to the target face feature as an identity information of the test object;
before the comparing the multi-modal features to the modal features comprised by each of at least one of the multi-modal feature sets in the pre-established feature registry, the method further comprising:
extracting face features corresponding to each of at least one of sample images by a pre-established face recognition feature extraction model, in an initial registration stage;
determining a human body feature corresponding to each of the sample images based on the human body feature of the multi-modal features of the test object; and
establishing a feature registry comprising at least one of the multi-modal feature sets of the at least one of the sample images, wherein each of the sample images in the feature registry corresponds to one multi-modal feature set comprising a corresponding face feature and a corresponding human body feature of the at least one of the multi-modal feature sets.

16. The storage medium according to claim 15, wherein the computer program is further configured to implement:
comparing each of modal features of the multi-modal features to the modal feature comprised by each of the at least one of the multi-modal feature sets in the feature registry, to obtain a comparison score of each of the modal features;
determining a weighted sum of the comparison score between each of the multi-modal feature sets and each of the modal features of the multi-modal features, with a set as a unit; and
determining the target multi-modal set corresponding to the highest comparison score based on the weighted sum.

17. The storage medium according to claim 16, wherein the weighted sum of the comparison score between each of the multi-modal feature sets and each of the modal features of the multi-modal features is determined based on the following formula:

$$S=a*d(pf_{face},gf_{face}(t))+(1-a)*d(pf_{body},gf_{body}(t))$$

wherein S represents the weighted sum of the comparison score between each of the multi-modal feature sets and each of the modal features of the multi-modal features, $pf_{face}$ represents the face feature of the multi-modal features, $pf_{body}$ represents the human body feature of the multi-modal feature, $gf_{face}(t)$ represents the face feature of each of the multi-modal feature sets, $gf_{body}(t)$ represents the human body feature of each of the multi-modal feature sets, d represents a similarity metric function, and a represents a preset weight.

* * * * *